(12) United States Patent
Hwang et al.

(10) Patent No.: US 10,073,974 B2
(45) Date of Patent: Sep. 11, 2018

(54) GENERATING CONTAINERS FOR APPLICATIONS UTILIZING REDUCED SETS OF LIBRARIES BASED ON RISK ANALYSIS

(71) Applicant: International Business Machines Corporation, Armonk, NY (US)

(72) Inventors: Jinho Hwang, Ossining, NY (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 15/216,190

(22) Filed: Jul. 21, 2016

(65) Prior Publication Data

US 2018/0025160 A1  Jan. 25, 2018

(51) Int. Cl.
  *G06F 21/57* (2013.01)
  *G06F 9/455* (2018.01)

(52) U.S. Cl.
  CPC ........ *G06F 21/577* (2013.01); *G06F 9/45558* (2013.01); *G06F 2009/45562* (2013.01); *G06F 2009/45587* (2013.01); *G06F 2221/034* (2013.01)

(58) Field of Classification Search
  CPC ............... G06F 21/577; G06F 9/45558; G06F 2009/45562; G06F 2009/45587; G06F 2221/034
  USPC .......................................................... 726/25
  See application file for complete search history.

(56) References Cited

U.S. PATENT DOCUMENTS

| | | | |
|---|---|---|---|
| 5,867,400 A * | 2/1999 | El-Ghoroury | G06F 15/7867 716/101 |
| 5,901,314 A | 5/1999 | Boehme et al. | |
| 6,526,565 B1 * | 2/2003 | Nally | G06F 8/61 717/108 |
| 6,538,660 B1 * | 3/2003 | Celi, Jr. | G09G 5/14 345/592 |
| 7,420,952 B2 * | 9/2008 | da Costa | H04L 41/0806 370/319 |

(Continued)

*Primary Examiner* — Eleni A Shiferaw
*Assistant Examiner* — Shahriar Zarrineh
(74) *Attorney, Agent, or Firm* — Louis J. Percello; Ryan, Mason & Lewis, LLP

(57) ABSTRACT

A method includes analyzing a given application to determine one or more packages utilized by the given application, the one or more packages comprising a plurality of libraries, identifying a subset of the plurality of libraries utilized by the given application, determining one or more dependent libraries for each of the identified libraries in the subset, generating a given container for the given application, the given container comprising the identified libraries in the subset and the dependent libraries for each of the identified libraries, performing risk analysis for the given container including comparing a risk value calculated for the given container to a designated risk threshold, simulating one or more actions in the given container responsive to the risk value calculated for the given container exceeding the designated risk threshold, and determining whether to accept or reject the given container responsive to the risk analysis and simulated actions.

20 Claims, 14 Drawing Sheets

(56) References Cited

U.S. PATENT DOCUMENTS

| | | | | |
|---|---|---|---|---|
| 7,617,479 B2* | 11/2009 | Hambrick | | G06F 8/20 |
| | | | | 717/104 |
| 7,966,203 B1* | 6/2011 | Pietrzak | | G06Q 40/08 |
| | | | | 705/35 |
| 8,566,835 B2 | 10/2013 | Wang et al. | | |
| 8,707,283 B2* | 4/2014 | Jung | | G06F 9/445 |
| | | | | 717/163 |
| 8,869,164 B2 | 10/2014 | Bobroff et al. | | |
| 9,116,768 B1 | 8/2015 | Sawhney et al. | | |
| 9,386,463 B1* | 7/2016 | Contino | | H04W 24/02 |
| 9,558,017 B2* | 1/2017 | Plate | | G06F 8/71 |
| 9,652,617 B1* | 5/2017 | Evans | | G06F 21/57 |
| 2003/0135771 A1* | 7/2003 | Cupps | | G06F 1/1626 |
| | | | | 713/320 |
| 2004/0268316 A1* | 12/2004 | Fisher | | G06F 11/3466 |
| | | | | 717/130 |
| 2005/0091192 A1* | 4/2005 | Probert et al. | | G06F 8/62 |
| 2006/0136678 A1 | 6/2006 | Wu et al. | | |
| 2006/0161898 A1* | 7/2006 | Bauman | | G06F 8/61 |
| | | | | 717/127 |
| 2007/0169103 A1* | 7/2007 | Bhatkhande | | G06F 8/71 |
| | | | | 717/170 |
| 2009/0126012 A1* | 5/2009 | Treadwell | | G06F 21/51 |
| | | | | 726/22 |
| 2009/0319478 A1* | 12/2009 | Proux | | G06F 17/30067 |
| 2010/0241469 A1* | 9/2010 | Weigert | | G06F 8/75 |
| | | | | 717/124 |
| 2011/0185429 A1* | 7/2011 | Sallam | | G06F 21/562 |
| | | | | 726/24 |
| 2012/0030667 A1* | 2/2012 | Bowyer | | G06F 8/61 |
| | | | | 717/174 |
| 2012/0042384 A1* | 2/2012 | Badhwar | | G06F 21/128 |
| | | | | 726/25 |
| 2012/0317647 A1* | 12/2012 | Brumley | | G06F 21/00 |
| | | | | 726/25 |
| 2013/0074187 A1* | 3/2013 | Kim | | G06F 21/56 |
| | | | | 726/24 |
| 2013/0185047 A1* | 7/2013 | Jackson | | G06F 17/5009 |
| | | | | 703/22 |
| 2013/0283250 A1* | 10/2013 | Eichenberger | | G06F 8/43 |
| | | | | 717/144 |
| 2014/0082729 A1* | 3/2014 | Shim | | G06F 21/51 |
| | | | | 726/23 |
| 2014/0298318 A1* | 10/2014 | Ahn | | G06F 8/60 |
| | | | | 717/174 |
| 2015/0066424 A1* | 3/2015 | Bae | | G06F 1/3206 |
| | | | | 702/150 |
| 2015/0120818 A1* | 4/2015 | Kim | | G06F 9/45558 |
| | | | | 709/203 |
| 2016/0043892 A1 | 2/2016 | Hason et al. | | |
| 2016/0055331 A1* | 2/2016 | Szczeszynski | | G06F 21/64 |
| | | | | 726/22 |
| 2016/0099963 A1* | 4/2016 | Mahaffey | | H04L 63/1433 |
| | | | | 726/25 |
| 2016/0357531 A1* | 12/2016 | Trofin | | G06F 8/443 |
| 2016/0357958 A1* | 12/2016 | Guidry | | G06F 21/53 |
| 2017/0075684 A1* | 3/2017 | Forguson | | G06F 8/70 |
| 2017/0091078 A1* | 3/2017 | Atyam | | G06F 11/3672 |
| 2017/0322824 A1* | 11/2017 | Reuther | | G06F 3/0604 |

\* cited by examiner

```
/usr/lib/libbind9.so.90
├─libdns.so.100 => /usr/lib/libdns.so.100 (0x00007fc981bc000)
│  ├─libisc.so.95 => /usr/lib/libisc.so.95 (0x00007fc98ed36000)
│  │  ├─libpthread.so.0 => /lib/x86_64-linux-gnu/libpthread.so.0 (0x00007fc98e03d000)
│  │  ├─libc.so.6 => /lib/x86_64-linux-gnu/libc.so.6 (0x00007fc98e971000)
│  │  └─ld-linux-x86-64.so.2 => /lib64/ld-linux-x86-64.so.2 (0x00007fc98fa7000)
│  ├─libxml2.so.2 => /usr/lib/x86_64-linux-gnu/libxml2.so.2 (0x00007fc98d6cc000)
│  ├─libdl.so.2 => /lib/x86_64-linux-gnu/libdl.so.2 (0x00007fc98e25b000)
│  ├─libz.so.1 => /lib/x86_64-linux-gnu/libz.so.1 (0x00007fc98ca54000)
│  ├─liblzma.so.5 => /lib/x86_64-linux-gnu/liblzma.so.5 (0x00007fc98c831000)
│  ├─libm.so.6 => /lib/x86_64-linux-gnu/libm.so.6 (0x00007fc98c52b000)
│  ├─libgssapi_krb5.so.2 => /usr/lib/x86_64-linux-gnu/libgssapi_krb5.so.2 (0x00007fc98e72b000)
│  ├─libkrb5.so.3 => /usr/lib/x86_64-linux-gnu/libkrb5.so.3 (0x00007fc98e45f000)
│  ├─libk5crypto.so.3 => /usr/lib/x86_64-linux-gnu/libk5crypto.so.3 (0x00007fc98d49c000)
│  ├─libkrb5support.so.0 => /usr/lib/x86_64-linux-gnu/libkrb5support.so.0 (0x00007fc98d08d000)
│  ├─libcom_err.so.2 => /lib/x86_64-linux-gnu/libcom_err.so.2 (0x00007fc98d298000)
│  ├─libkeyutils.so.1 => /lib/x86_64-linux-gnu/libkeyutils.so.1 (0x00007fc98ce88000)
│  ├─libresolv.so.2 => /lib/x86_64-linux-gnu/libresolv.so.2 (0x00007fc98cc6d000)
│  ├─libcrypto.so.1.0.0 => /lib/x86_64-linux-gnu/libcrypto.so.1.0.0 (0x00007fc98dc61000)
│  ├─libGeoIP.so.1 => /usr/lib/x86_64-linux-gnu/libGeoIP.so.1 (0x00007fc98da32000)
│  └─libisccfg.so.90 => /usr/lib/libisccfg.so.90 (0x00007fc98ef99000)
```

600

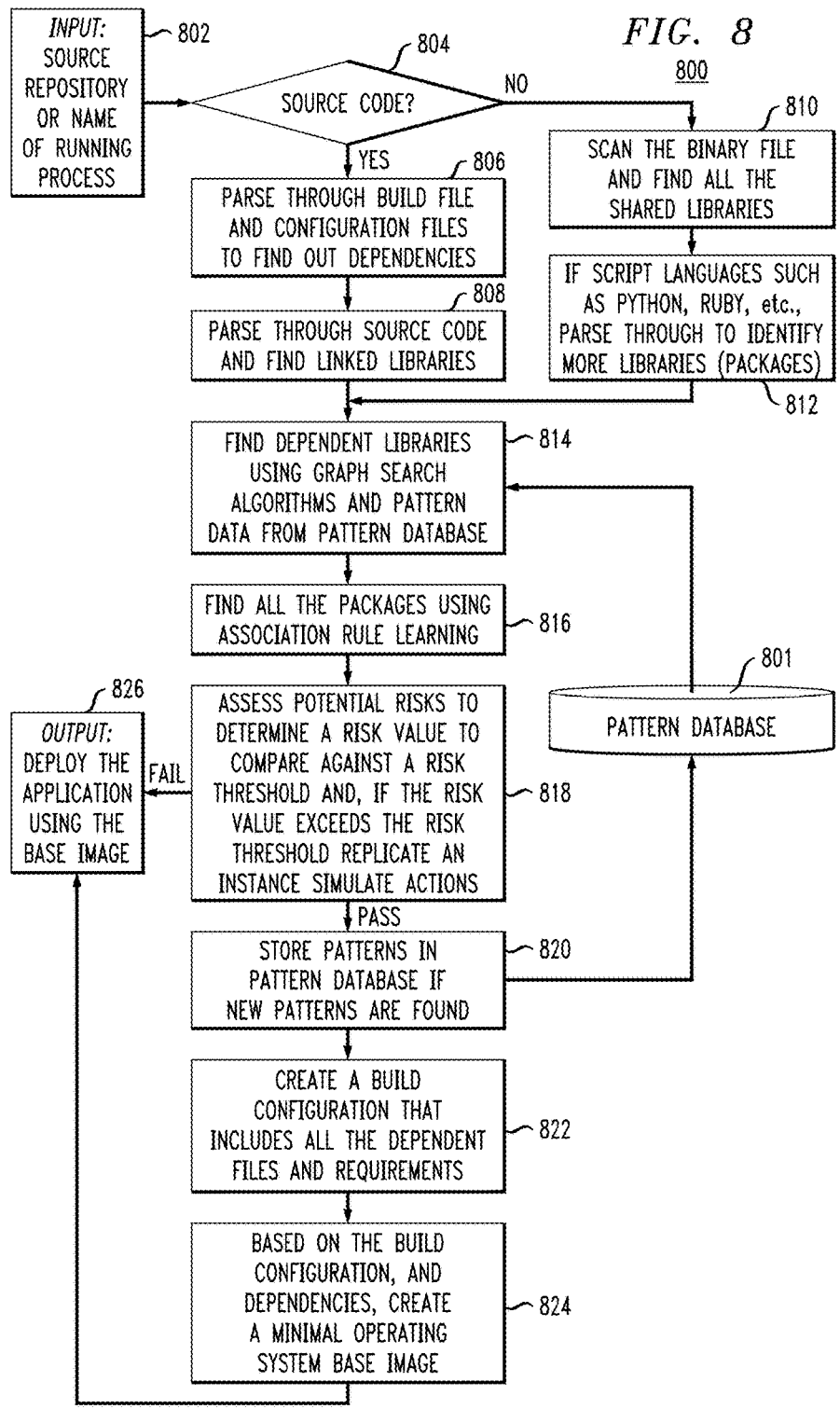

FIG. 9

```
Input: A graph Graph and a starting vertex root of Graph
Output: All vertices reachable from root labeled as explored.
Breadth-First-Search(Graph, root):
    for each node n in Graph:
        n.distance = INFINITY
        n.parent = NIL create empty queue Q
    root.distance = 0
    Q.enqueue(root)

while Q is not empty:
        current = Q.dequeue()
        for each node n that is adjacent to current:
            if n.distance == INFINITY:
                n.distance = current.distance + 1
                n.parent = current
                Q.enqueue(n)
```

FIG. 10

```
C_k: Candidate itemset of size k
L_k : frequent itemset of size k

L_1 = {frequent items};
for ( k = 1; L k != ∅; k++) do begin
    C_{k+1} = candidates generated from L_k;
    for each transaction t in database do
        increment the count of all candidates in C_{k+1} that are contained in t
    L_{k+1} = candidates in C_{k+1} with min_support
    end
return ∪_k L_k;
```

Inputs: labeled set $D_l$, unlabeled set $D_u$, number of steps T, number of examples per iteration S $t = 1$;
while $t <= T$ do
    Train a multi-label support vector machine (SVM) classifier f based on training data $D_l$
    for each instance x in $D_u$ do
        Predict its label vector $\underline{y}$ using a loss reduction (LR)-based prediction method, e.g., with an equation for maximum LR with maximal confidence:
$$D^*_s = \text{argmax}_{D_s} \{\Sigma_{x \in D_s} \Sigma_{i=1}^l ((1 - \underline{y}^i f_i(x))/2)\}$$
        constrained to $\underline{y}^i \in \{-1, 1\}$
        Calculate the expected LR with the most confident label vector $\underline{y}$,
$$\text{score}(x) = \Sigma_{i=1}^k ((1 - \underline{y}^i f_i(x))/2)$$
        Sort score(x) in decreasing order for all x in $D_u$
        Select a set of S examples $D^*_s$ with the largest scores (or experienced subject matter expert (SME) input), and
        Update the training set $D_l \leftarrow D_l + D^*_s$
    end for
    Train the multi-label learner l with $D_l$
    $t = t + 1$;
end while

GENERATING CONTAINERS FOR APPLICATIONS UTILIZING REDUCED SETS OF LIBRARIES BASED ON RISK ANALYSIS

BACKGROUND

The present application relates to computing, and more specifically, to applications. An application, also referred to as a compute instance herein, may be run in an operating system that includes a set of various applications and library packages. The compute instance, including the operating system, applications and such packages, may form part of a container with a large memory footprint.

SUMMARY

Embodiments of the invention provide techniques for generating containers for applications utilizing reduced sets of libraries based on risk analysis.

For example, in one embodiment, a method comprises analyzing a given application to determine one or more packages utilized by the given application, the one or more packages comprising a plurality of libraries, identifying a subset of the plurality of libraries utilized by the given application, determining one or more dependent libraries for each of the identified libraries in the subset, generating a given container for the given application, the given container comprising the identified libraries in the subset and the dependent libraries for each of the identified libraries, performing risk analysis for the given container, the risk analysis comprising comparing a risk value calculated for the given container to a designated risk threshold, simulating one or more actions in the given container responsive to the risk value calculated for the given container exceeding the designated risk threshold, and determining whether to accept or reject the given container responsive to the risk analysis and simulated actions, wherein the method is performed by at least one processing device comprising a processor coupled to a memory.

BRIEF DESCRIPTION OF THE DRAWINGS

FIG. 6 depicts an example of a library dependency tree, according to an embodiment of the invention.

FIG. 8 depicts a process for generating a container for an application, according to an embodiment of the invention.

FIG. 9 depicts pseudocode of a graph search algorithm for finding dependency patterns, according to an embodiment of the invention.

FIG. 10 depicts pseudocode of a breadth-first search algorithm for rule learning, according to an embodiment of the invention.

FIG. 11 depicts pseudocode of an algorithm for learning dependency patterns, according to an embodiment of the invention.

DETAILED DESCRIPTION

Illustrative embodiments of the invention may be described herein in the context of illustrative methods, systems and devices for generating containers for applications that utilize reduced sets of libraries. However, it is to be understood that embodiments of the invention are not limited to the illustrative methods, systems and devices but instead are more broadly applicable to other suitable methods, systems and devices.

As described above, applications or compute instances may be run on operating system images or containers that include numerous packages each comprising a plurality of libraries. Embodiments provide techniques for generating containers for applications that utilize reduced sets of libraries. The containers may thus be viewed as reduced size or minimal-sized virtual machines (VMs) or containers.

Figure 1:
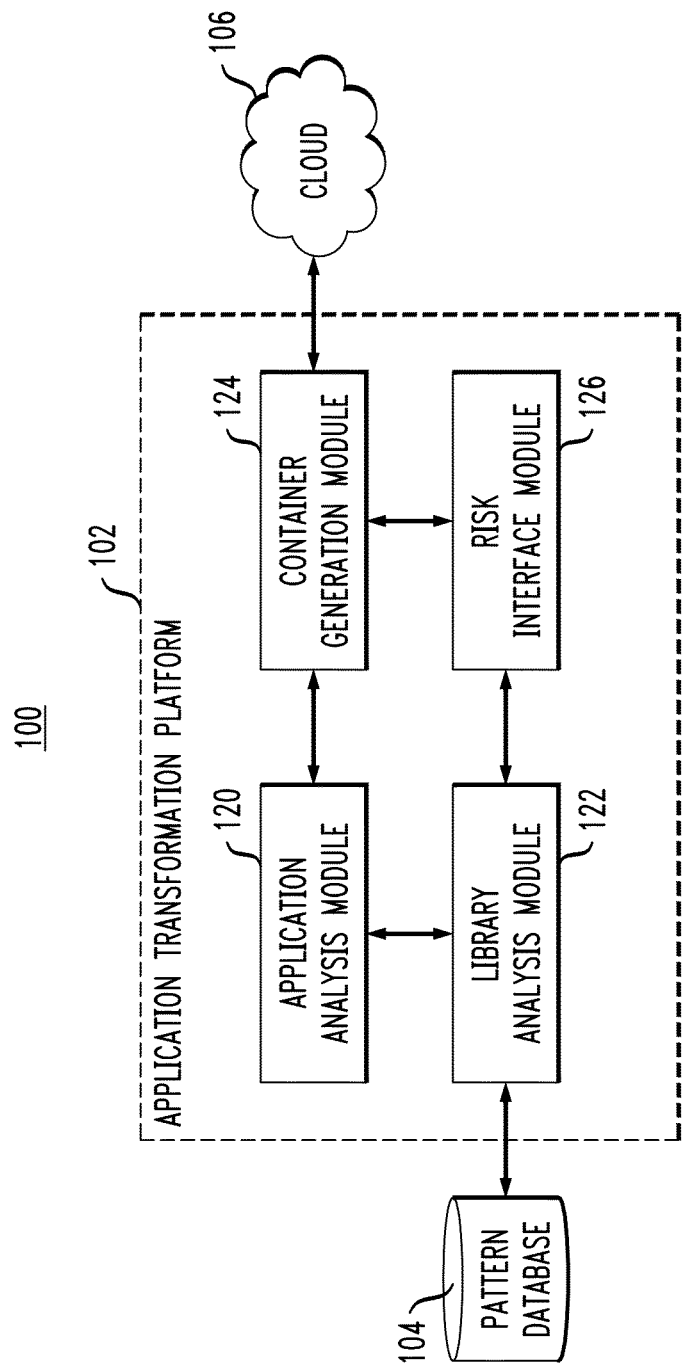
FIG. 1 depicts a system for generating containers for applications, according to an embodiment of the present invention.

FIG. 1 depicts a system 100 that includes an application transformation platform 102, a pattern database 104 and a cloud computing environment 106. The application transformation platform 102 includes an application analysis module 120, a library analysis module 122, a container generation module 124 and a risk interface module 126.

Although FIG. 1 illustrates an arrangement with a single cloud computing environment 106, embodiments are not so limited. The application transformation platform 102, in some embodiments, may be coupled to multiple cloud computing environments over one or more networks. In addition, although FIG. 1 shows the application transformation platform 102 and pattern database 104 as being implemented external to the cloud computing environment 106, in some embodiments one or both of the application transformation platform 102 and the pattern database 104 may be implemented at least in part internal to the cloud computing environment 106.

The application analysis module 120 may be configured to analyze an application or compute instance. The application or compute instance may utilize or refer to different packages and/or one or more application. Each package contains or includes a number of different libraries. Although an application may refer to or make use of a given package, the application will often utilize less than all of the libraries that are part of the given package. The application analysis module 120 can analyze static source code of the application and/or utilize a binary scanner for a running application to identify a subset of the libraries in each package that are actually utilized by the application.

Library analysis module 122 of the application transformation platform 102 determines dependent libraries for each of the identified subset of libraries. The library analysis module 122 may utilize pattern database 104, which may store dependency graphs that capture dependency patterns amongst libraries so as to identify dependent libraries for each of the identified subset of libraries. The library analysis module 122, in some embodiments, performs association rule learning to find packages associated with dependent libraries and employs learning algorithms to find new patterns that can be used for certain types of applications. This information may be used by the library analysis module 122 to update information stored in the pattern database 104.

Container generation module 124 generates a container for the application, where the container utilizes a reduced set of libraries, e.g., the identified subset of libraries as well as the dependent libraries for the identified subset of libraries. The generated container may be a minimal operating system (OS) or base image with a minimum or reduced size installation. Container generation module 124 may deploy the generated container in cloud computing environment 106, possibly in accordance with a software-as-a-service (SaaS) model.

The risk interface module 126 analyzes the generated container, and conducts a risk analysis to determine the feasibility of the adjustment. For example, the risk analysis may seek to determine potential issues associated with running the application in the generated container with the reduced set of libraries. As described in further detail below, if the risk analysis indicates that a particular transformation or generated container is risky, the compute instance may be replicated and one or more actions may be simulated in the generated container before determining whether to accept or reject the given container.

Thus, the application transformation platform 102 may provide for automated composition of dependent library components through source code analysis and a binary scanner. Various off-the-shelf tools for code analysis may be suitably modified so as to identify libraries as described herein. Examples of such tools include IBM® Security AppScan Source Edition, Brakeman, Codesake Dawn, Find-Bugs, Flawfinder, Microsoft® FxCop, Google® CodeSearchDiggity, OWASP SWAAT Project, PMD, Pre-FAST, SonarQube®, VisualCodeGrepper (VCG), bug-Scout®, Contrast, KlocWork®'s Insight, Parasoft® Test, Pitbull Source Code Control (SCC), Quotium Seeker, Pentest's Source Patrol, Armorize Technologies Static Source Code Analysis with CodeScure™, Optimyth Kiuwan Software-as-a-Service (SaaS) Software Quality and Security Analysis, Checkmarx's Static Code Analysis, Coverity®'s Security Advisor, PVS-Studio, HP® Fortify Source Code Analysis, Veracode®, Whitehat's Sentinel Source Solution, etc. Binary scanners can decompose what shared libraries are in use for a binary. The type of binary scanner used may depend on the type of operating system. As an example, in Linux® systems, the ldd binary scanner may be used.

The application transformation platform 102 can analyze build files, configuration files and/or binaries to find shared libraries, analyze source code for script languages, find dependent libraries such as shared object or static objects, and find additional dependent libraries from the pattern database 104. This information may be utilized by the application transformation platform 102 so as to create a minimal or reduced size OS image or container, as well as in learning new policies and recommendations for creating minimal or reduced size containers.

The application transformation platform 102 may be utilized in a number of different contexts. As an example, the application transformation platform 102 may be used in a development or operations cycle to derive minimal OSes for running applications, to generate base minimal OSes for future development and operations, and to provide minimal OSes as an end-product for consumers, such as in accordance with a SaaS model in cloud computing environment 106.

Containers generated using the application transformation platform 102 may, in some embodiments, be used to ease transitioning to newer technology with minimum dependency trees. For example, VMs may be converted to containers which may be converted to micro-containers, etc. Learning new patterns for storage in pattern database 104 continually improves efficiency in finding dependent libraries and their associated packages. The term library as used herein may refer to an individual installation. As an example, a library file may have a ".so" extension. The term package as used herein may refer to a compound or other group of libraries. Once a library is found, in some embodiments a next step is to find which package the library belongs to. The use of the minimal or reduced size containers also provides various security advantages and can speed up distribution time. Risk assessment functionalities of the application transformation platform 102 can be used to assess business impacts of transformations, potential risks for running applications in constrained or minimal-sized environments, potential programming glitches, potential risks for version mismatches, etc. The application transformation platform 102 can also simulate, at least in part by replication, minimization actions in generated containers to determine whether to accept or reject generated containers responsive to risk analysis indicated that the risk associated with an application or generated container exceeds a designated threshold.

Transforming applications or compute instances into the generated containers using application transformation platform 102 can provide an advanced architecture with higher security. This can lead to, among other things, optimizing cloud computing environments such as cloud computing environment 106. Compliant base minimal OS images can be used to provide better compliance metrics for enterprises. Reduced cost, both in monetary terms and in computing resource terms (e.g., reduced storage, compute and networking resource requirements), also provides advantages such as increasing customer satisfaction and providing resource efficiencies.

Figure 2:
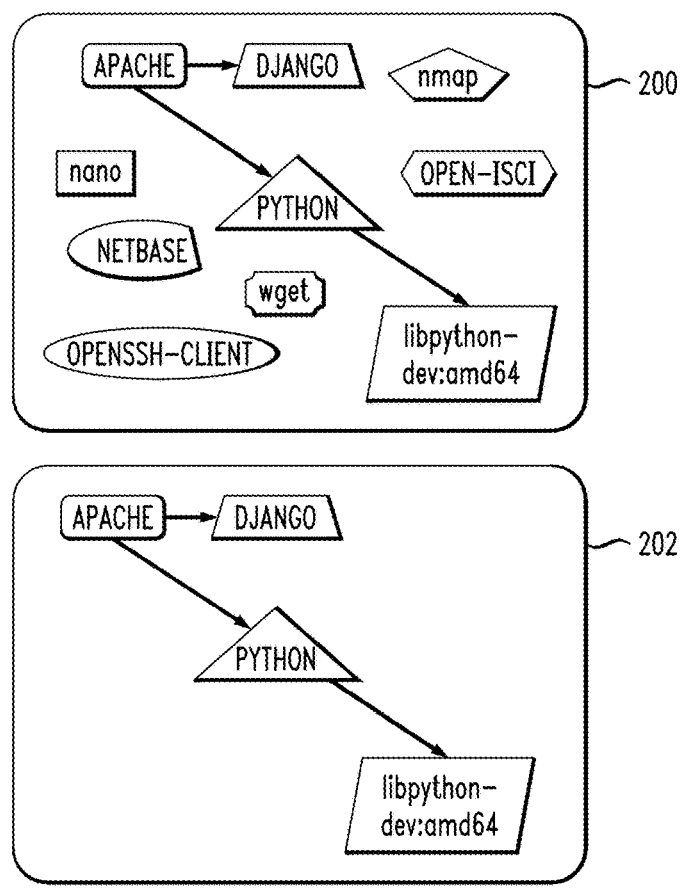
FIG. 2 depicts an example transformation of a container for an application, according to an embodiment of the invention.

FIG. 2 depicts an example transformation of a container for a given application. In this particular example, the given application is a web application that uses Apache. A particular application itself may use or reference other applications or packages as described below. Thus, the term application as used herein may refer to an application that utilizes one or more other applications. An application may be used by a user to perform a task. Microsoft® Word is an example of such an application. Multiple packages may support an application such as Microsoft® Word to support various actions performed using the application. Each package may include multiple libraries. A particular application, however, may not necessarily utilize all of the libraries in a particular package. Thus, a container that includes all packages referenced or utilized by the application may be larger than strictly required.

The web application example in FIG. 2 utilizes the Apache application. The Apache application, as an example, may require various libraries to run. For example, installing the "apache2" application in certain Linux® operating systems may require extra packages to be installed, such as apache2-bin, apache2-data, apache2-mpm-prefork. The apache2 application may also include a number of suggested packages such as apache2-doc, apache2-suexec-pristine, apache2-suexec-custom.

The container 200 for the web application, which may be viewed as an original or default container prior to transformation using the application transform platform 102, includes or references a number of applications such as Apache, Django, nano, nmap, Python, netbase, wget, Openssh-client and open-isci. In this particular example, however, not all of these applications are utilized by the web application. For example, the applications nano, nmap, netbase, wget, Openssh-client and open-isci are not utilized specifically by the web application in this example. Further, even for packages that are used, such as Python, not all of the Python libraries are needed. In this example, the web application only needs library libpython-dev:amd64 from the Python package.

The container 200 shown in FIG. 2 may represent a large virtual machine or container with a large memory footprint. As an example, the container 200 may be a 100 megabyte (MB) OS container. As the container 200 has a relatively large memory footprint, it may have a long boot time and waste processing power or other compute, storage and networking resources.

FIG. 2 also shows a reduced-size or minimal container 202. As shown, the container 202 include the packages for the Apache and Django applications, as well as the libpython-dev:amd64 library of Python. Using the reduced set of libraries, the container 202 may have a size of 30 MB, compared to the 100 MB size of container 200.

Figure 3:
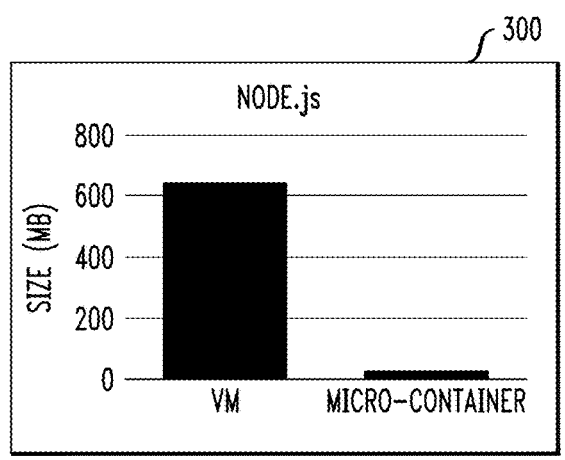
FIG. 3 depicts a chart illustrating reduction in size of a container for an application, according to an embodiment of the invention.

The container generated by the application transformation platform 102 may be a micro-container or minimal OS. Micro-containers are tiny and portable docker containers, and provide a number of benefits. For example, micro-containers are small. FIG. 3 shows a chart 300 illustrating a comparison in size of a VM and a micro-container for Node.js®, a web application for programming in JavaScript. As shown, the micro-container is approximately 22 times smaller relative to the VM. This reduction in size, in addition to utilizing less storage, can also provide other benefits such as faster boot or run time and the ability to run on more virtual instances e.g., portability. Micro-containers also facilitate fast and easy distribution for applications, due in part to their smaller size which means that it is quicker to download a micro-container image from a Docker registry e.g., Docker Hub, and can therefore be distributed to different machines much quicker. These distribution advantages also facilitate compliance checking, recovery or checkpointing, and disaster recovery.

Micro-containers also provide improved security, as micro-containers include less code and programs and thus have less attack surface. Also, the base OS of the micro-container can be more secure. For example, a micro-container may have no other open network ports other than those specifically required for the application. Minimal-sized VM or containers aid in reducing the impact from exploits, such as for example the vmsplice( ) local root exploit which can be compromised to give root privileges. Removing unnecessary packages and libraries can also improve security by excluding the effects of userland buffer overflows. Also, some packages may run from time to time and interfere with the performance of running applications, leading to susceptibility to denial of service (DoS) type attacks. Open ports, other than those needed by an application, can thus be accessed and exploited by attackers. Also, some packages that are used rarely may cause problems when they are run in the future due to version problems.

Figure 4:
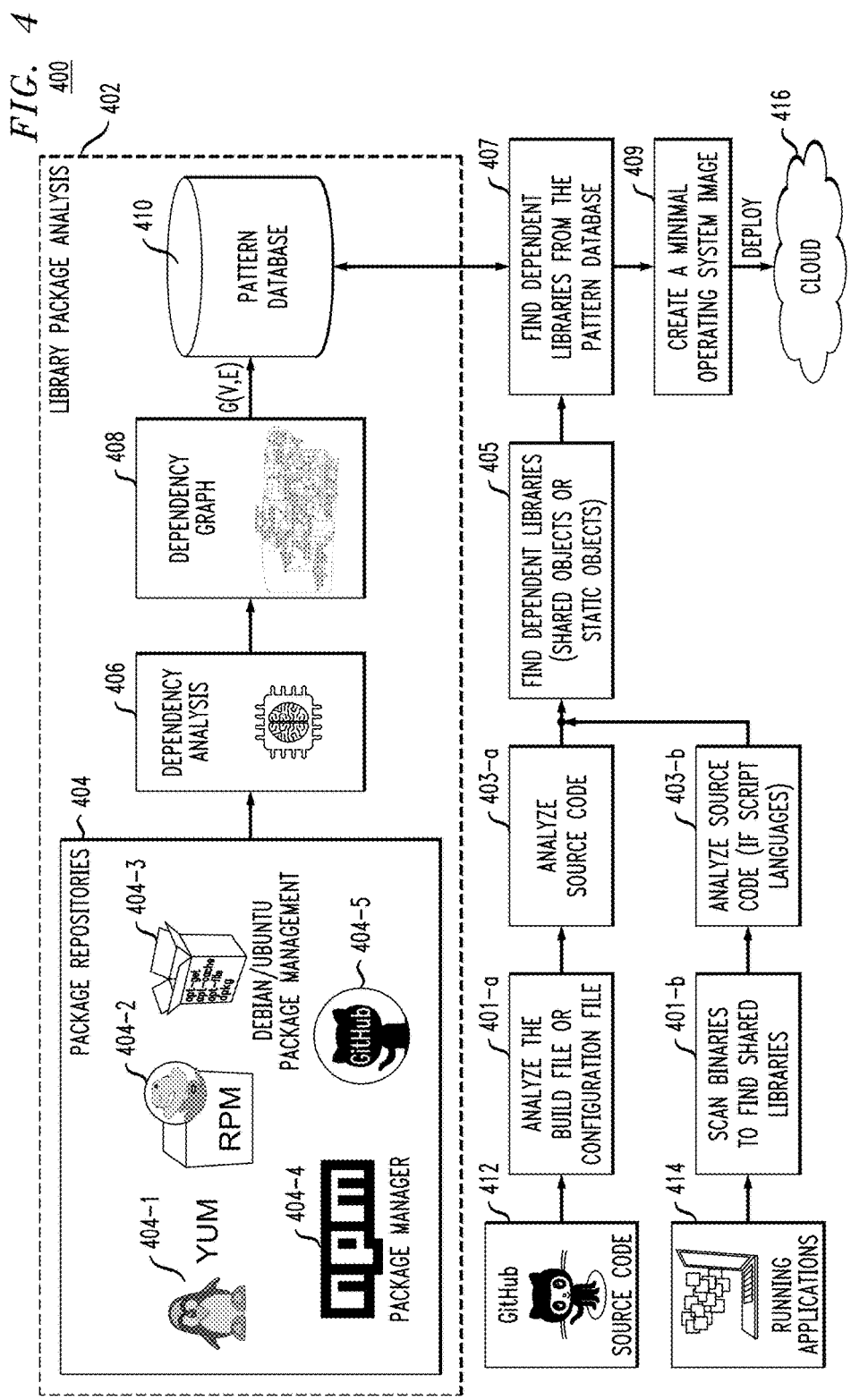
FIG. 4 depicts a process for generating containers for applications, according to an embodiment of the invention.

FIG. 4 shows a process 400, which may be used to generate containers for applications. In some embodiments, process 400 may transform an existing container into a minimal-sized or reduced size container. In other embodiments, process 400 may create a minimal-sized or reduced size container from scratch, rather than converting or transforming an existing container. The process begins with step 402, library package analysis. Library package analysis 402 may, in some embodiments, be considered independent from generating a container for a particular application. For example, the library package analysis 402 may be conducted prior to receiving a request to create a container for a particular application. The results of library package analysis 402, e.g., information stored in pattern database 410, may be utilized when generating a container for a particular application. Library package analysis 402, however, does not have to be completed prior to receiving a request to generate a container for a particular application. The library package analysis 402 may be conducted continuously, periodically, in response to a specific request, etc. The results of generating a container for a given application may also be used in library package analysis 402, such as in updating dependency graphs or other pattern data stored in pattern database 410.

Library package analysis 402 includes analyzing various package repositories 404, conducting dependency analysis 406, generating dependency graphs 408, and storing library dependency directional graphs or other pattern data in pattern database 410. Package repositories 404 may include various package sources. FIG. 4 illustrates an example wherein the package repositories include Yellowdog Updater Modified (yum) package manager 404-1, Red Hat® Package Manager (RPM) 404-2, Debian®/Ubuntu® package management 404-3 such as the Advanced Package Tool (APT), Node.js® package manger (npm) 404-4 and GitHub® 404-5. It is to be appreciated, however, that these are merely examples of possible package repositories, and that embodiments are not limited solely to use with these package repositories. Instead, various other types of package managers and repositories may be used including but not limited to Linux® package managers such as dpkg, GNU® Guix, ipkg, netpkg, OpenPKG, opkg, slackpkg, Snappy, Steam®, Zero Install (0install), etc. In addition, package managers and repositories for other type of operating systems other than Linux® operating systems may be used, including package repositories for operating systems including Microsoft® Windows®, Mac® OS X® and iOS, Android™, etc.

Library package analysis 402 conducts dependency analysis 406 for packages and libraries in the package repositories 404. The dependency analysis 406 may be used to produce one or more dependency graphs 408 which are stored in the pattern database 410. Details regarding dependency analysis 406 and dependency graphs 408 will be discussed in further detail below. The result of library package analysis 402 is that library dependency directional graphs (or other types of pattern data) are generated and stored in the pattern database 410, which will be used for finding dependent libraries during the process 400 for generating a container for a given application.

As shown, source code 412 or running applications 414 may be used in the process 400 for generating a container for a given application. As shown, the source code 412 is obtained from GitHub®, but this is merely an example and not a requirement. Source code 412 such as build files, configuration files, etc. may be obtained from various sources in other embodiments. Running applications 414 include binaries, executables, etc. While FIG. 4 shows the running applications 414 as being obtained from a laptop computer, embodiments are not so limited. Running application 414 may be obtained from various other types of computing and processing devices, including desktop computers, servers, tablets, smartphones, smartwatches and other wearable devices, virtual computing environments, cloud computing environments, etc.

In some embodiments, a request to generate a container may have as input either a source repository (e.g., git) or the name of a running process (e.g., apache2). If a source repository or more generally source code 412 is the input, the process 400 proceeds along the path "a" including steps 401-a and 403-a, whereas if a process name or more generally a running application 414 is the input, the process 400 proceeds along the path "b" including steps 401-b and 403-b. Path "a" includes analyzing the build file or configuration file in step 401-a, and analyzing source code in step 403-a. Path "b" includes scanning the binary or binaries to find shared libraries in step 401-b, and analyzing source code if script languages (e.g., Python, Ruby, etc.) are used in the binary. In some cases, it is difficult or not possible to read the source of a binary. For example, in a C program, the source cannot be read. Shared libraries, however, may be found using commands such as ldd described above. Scripting languages such as Python or Ruby can be read in a production system, so it is possible to find libraries used by reading source code lines. While the paths "a" and "b" are described above in the alternative, in some embodiments both paths may be used, such as in a request to generate a container for a running application and source code for example.

In step 405, dependent libraries are found based on the results of steps 401-a, 403-a, 401-b and/or 403-b. Dependent libraries, in some cases, take the form of a static object or a library that is used by a single application, which requires a recompilation of the application once the static objects are added. Dependent libraries, in other cases, take the form of a shared object, in that multiple different applications may utilize a single shared object.

The dependent libraries identified or found in step 405 may represent a subset of all of the dependent libraries that should be included in a container generated for a given application. For example, the source code for the given application may contain a reference to or utilize a first dependent library, where the first dependent library itself contains a reference to or utilizes a second dependent library. The second dependent library may not be directly referenced or utilized in the source code for the given application and thus not found or identified in step 405. Nonetheless, the second dependent library in some cases should be included in the container generated for the given application. The process 400 thus continues to step 407, where additional dependent libraries are found using information in the pattern database 410. As the process 400 proceeds any missing links or dependencies, as well as any incorrectly identified dependencies, can be used as feedback to update information stored in the pattern database 410 and to reduce the risk of generating the container with the reduced set of libraries.

In step 407, each of the dependent libraries that are identified or found in step 405 are analyzed against the pattern data such as dependent graphs that are stored in pattern database 410 so as to determine all of the dependencies for such dependent libraries (also referred to herein as connected components of the given application). Using the dependent libraries identified or found in steps 405 and 407, the process 400 generates a minimal or reduced size operating system image or container in step 409. The minimal or reduced size operating system image or container is then deployed on cloud 416.

Generation of the minimal or reduced size operating system image or container in step 409 may proceed differently depending on the "direction" of a particular instance of process 400. As mentioned above, generating the reduced size container may involve generating a container for a new application (e.g., an "adding" direction) or reducing the size of an existing application container (e.g., a "removing" direction). For a new application, step 409 may start from a bare minimum or base image for a specific operating system, where the dependent libraries identified in steps 405 and 407 are added to the base image to create the minimal or reduced size image for the new application. For an existing application, step 409 may include identifying the libraries in the existing container that are necessary, e.g., the dependent libraries identified in steps 405 and 407, and removing the rest of the libraries to create the minimal or reduced size image for the existing application container.

Figure 5:
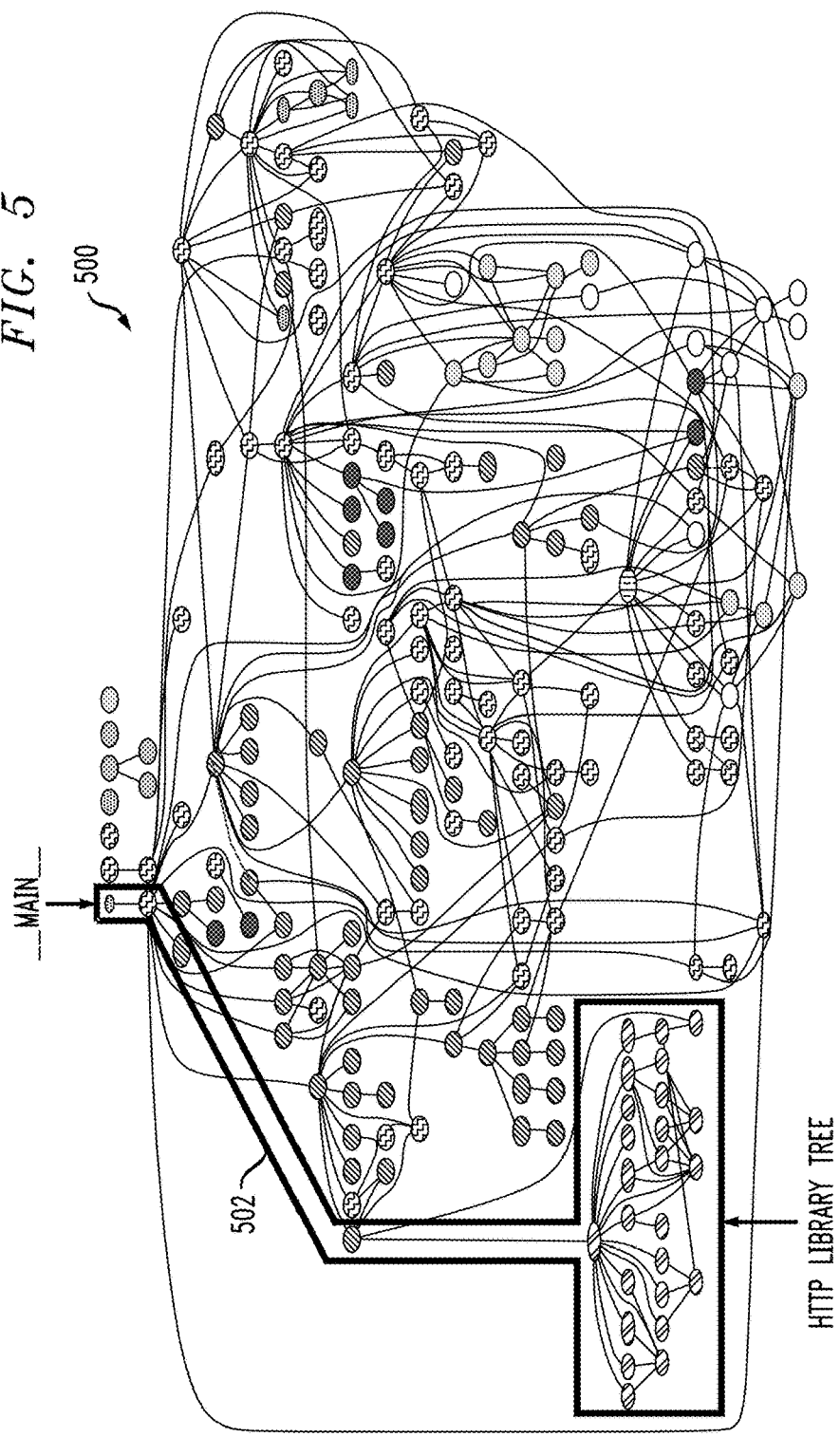
FIG. 5 depicts an example of a dependency graph, according to an embodiment of the invention.

FIG. 5 shows an example of a dependency graph 500. In particular, dependency graph 500 in FIG. 5 is a portion of a Python library dependency graph. Outlined in bold is a portion 502 of the dependency graph for the hypertext transfer protocol (HTTP) Library tree from the main node-_main_. The dependency graph 500 is a concept graph showing how parts of the library tree are related to one another. The dependency graph 500 may be viewed as a reflection of the FIG. 2 example, e.g., the dependency graph 500 may be zoomed in to reflect the dependencies shown in the FIG. 2 example.

FIG. 6 shows an example of a library dependency tree 600. In particular, library dependency tree 600 shows a portion of the GNU C Library, or glibc. Analysis of the dependency tree 600 illustrates the relations between different libraries. The library dependency tree 600 shows an example output from a binary scanner (e.g., output of step 401-b in the process 400).

Figure 7:
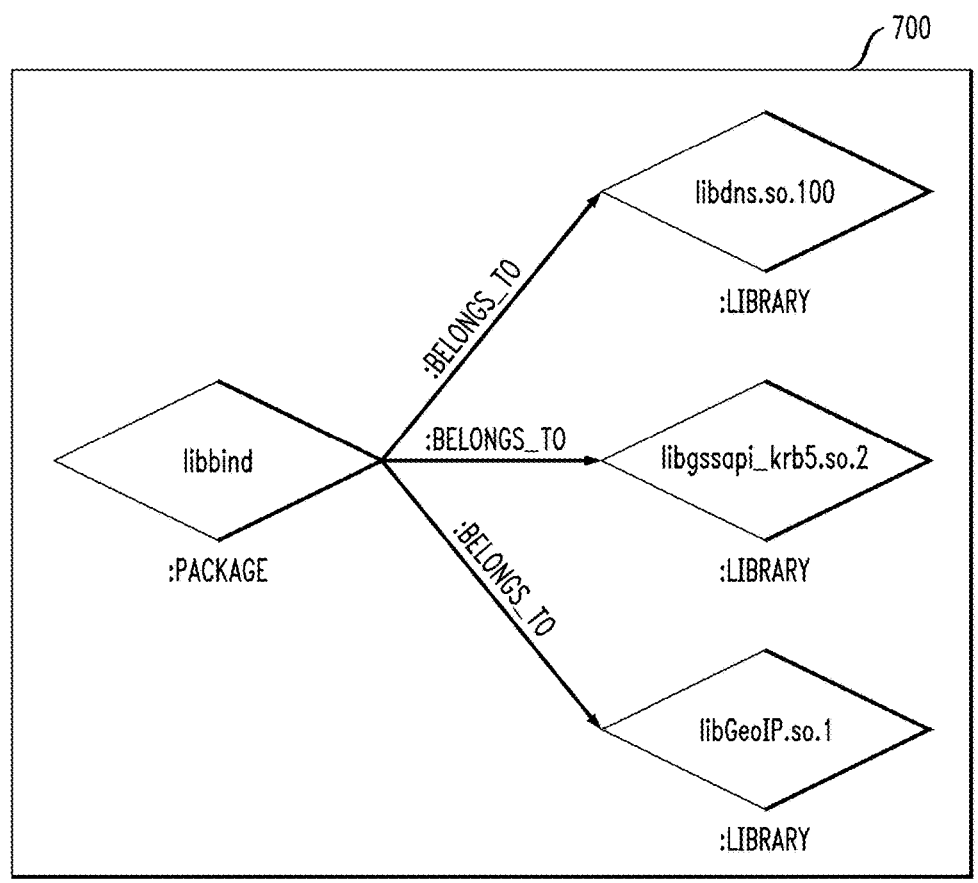
FIG. 7 depicts an example of a pattern graph, according to an embodiment of the invention.

Dependency trees or graphs such as those shown in FIGS. 5 and 6 may be analyzed and used to generate a pattern dependency model stored in a pattern database such as pattern database 104 or pattern database 410. FIG. 7 shows an example of a pattern graph 700 used for a graph database. The pattern graph 700 includes a number of nodes. For example, the node libbind is a package that belongs to other nodes including libdns.so.100, libgssapi_krb5.so.2 and libGeoIP.so.1. The nodes libdns.so.100, libgssapi_krb5.so.2 and libGeoIP.so.1 are library nodes, and belong to the package libbind. Each node, which may be an entity or an attribute in the graph database model, directly and physically contains a list of relationship-records that represent its relationships to other nodes. FIG. 6, as mentioned above, may be considered as an output of a binary scanner. FIG. 7 represents pattern information stored in pattern database 104 or pattern database 410. More particularly, pattern graph 700 illustrates package-library relationships. The dependency tree 600 of FIG. 6, as an example, illustrates a usage graph or dependencies between libraries.

FIG. 8 shows a process 800 for generating a container for an application. The process 800 begins with input in step 802, which as described above may indicate a source repository such as "git" or the name of a running process such as "apache2." It is important to note that these are merely examples of repositories and processes, and that embodiments are not limited to use with the specific example repositories and processes. In decision block 804, it is determined whether the input from step 802 is source code. If the input is source code, the process 800 continues with steps 806 and 808. If the input is not source code, the process 800 continues with steps 810 and 812. This split is similar to the distinction between the paths "a" and "b" described above with respect to FIG. 4.

In step 806, the build file and configuration files of the input source code are parsed to determine dependencies. In step 808, the source code itself is parsed to find dependent libraries, also referred to herein as linked libraries in the context of source code analysis. Linked libraries may be identified by searching for particular syntax, such as "include," require," "import," etc.

In step 810, the binary file is scanned to find all dependent libraries, also referred to herein as shared libraries in the context of binary analysis. In step 812, any scripts that are used by the binary file are parsed to identify additional dependent libraries or packages. A binary file, for example, may utilize one or more scripts or scripting languages such as Python, Ruby, etc. The binary scanner may be used to tell which script files are used by a binary or application. In a Linux® operating system, "strace" may be used to identify opened files, and "lsof" may be used to tell which processes open which files.

Results from steps 806, 808, 810 and 812 are used in step 814 to find dependent libraries using a graph search algorithm and pattern data from pattern database 801. Examples of graph search algorithms will be described in detail below.

In step 816, all packages are found using association rule learning. The dependent libraries from step 814 are used to identify the packages. In some cases, individual libraries cannot be installed using certain packaging systems like apt-get or yum. Instead, the package containing the dependent library needs to be installed. Examples of association rule learning algorithms will be described in detail below.

The process 800 then continues with risk analysis. In step 818, the potential risks are assessed and compared with a threshold risk value. The potential risks may be estimated or determined using a risk function. An example of a risk function R which may be used to perform risk analysis is described in further detail below. If the risk function or more generally risk analysis indicates a high risk associated with removing the identified dependent libraries, further action may be taken before deploying a minimized or reduced size container. For example, an instance may be replicated and various actions may be simulated. In this context, an instance refers to a container or virtual machine. Replicating the container or virtual machine involves making a copy of the original instance, such that simulation does not impact the original instance. Copied or replicated instances may have unnecessary libraries removed so as to make the replicated instances minimal or reduced size.

The replicated instances are used to simulate the effects of various minimization actions, e.g., the effects or risks of removing certain libraries. Simulation is used to determine whether the minimization actions jeopardize a running application using the instances with minimal or reduced size. This simulation may be particularly important in the context of production applications, as the risks of failure of production applications may have a direct impact on revenue. Simulation may also be used to identify or analyze how changes to one application by removal of certain dependent libraries can have an impact on other applications.

The risk assessment function, or more generally risk analysis, may be used to assess the business impacts of a transformation to a minimum or reduced size container, the potential risks for running an application in the constrained environment, potential programming glitches, potential risks for version mismatches, etc. Simulation of minimization actions by replication may be performed if the risk value exceeds a designated threshold so as to check validity before deploying a minimal or reduced size container. As will be described in further detail below, the simulation may be designed to test for a wide variety of potential risks.

In some embodiments, assessing the business impact of a transformation to a minimum or reduced size container involves looking at a relative importance of an application. For example, if an application is considered a core business application for a company, facing customers, and/or if the transformation has a chance of costing the company significant resources (e.g., millions of dollars), simulation by replication prior to deployment may be desired. If the risk is low, such as in an application that is not a core business application, is not customer facing, and/or has a small chance of negative financial impact, simulation by replication prior to deployment may be skipped. The decision of when to perform simulation by replication may be achieved by adjusting the risk threshold. The risk threshold, for example, may be set based on user input or other characteristics as will be discussed in further detail below.

In some embodiments, two or more of the replicated instances may differ from one another. A first replicated instance may be aggressive in terms of minimization, seeking to remove as many libraries as possible to create the smallest size replicated container for a given application. A second replicated instance may be less aggressive in terms of minimization, where some but not all of the unnecessary libraries are removed to create a reduced size replicated container for the given application. It is to be appreciated that more than two different types of replicated instances may be created for the given application as needed or desired. For example, in some cases three or more different replicated instances may be created with different levels of minimization by removing different amounts of libraries. Two or more replicated instances may also be the same size or same level of minimization, but differ in that a first replicated instance of a given size removes a first set of libraries while a second replicated instance of the given size removes a second set of libraries different than the first set of libraries. It is to be appreciated, however, that while the first and second sets of libraries are different, they may at least partially overlap, e.g., they may have one or more libraries in common and one or more libraries that are different from one another.

The particular number of replicated instances may vary as needed for a particular application. For example, a given replication may be tested against different types of failure scenarios to judge the riskiness of a particular minimization. It may be useful to reduce the overall time or to take advantage of parallelization, to run the same replication against different sample workloads for the given application or subject the same replication to different types of attacks to calculate a risk value for that particular minimization.

In some embodiments, simulation by replication may involve a number of different types of tests or other analysis. In some cases incompatibility may be the main risk when removing existing libraries to generate a minimal or reduced size container. As an example, if an application is implemented only for Python 2.7 but the system installs packages from Python 3.0, the system may generate errors and the application may crash.

Testing or analyzing business impact may be based on a number of factors. For example, the criticality or importance of an application may be known based on user input, or inferred from characteristics of the application or user. In some cases, the business impact may be derived from the importance or criticality of the application. A particular application or instance may be connected to other servers, applications, etc. In such cases, an application crashing in one instance may propagate and causes errors or crashes for other applications, instances, servers, etc. Thus, in some embodiments business impact may be measured based on a connectedness of the instance or application. Business impact may also or alternatively be measured or tested based on the type of data within or otherwise used by the application. For example, an application that handles secret or sensitive business or customer information may have a relatively higher business impact than an application that utilizes only publicly available information.

Risk analysis may also be used to determine other types of risk, such as the risk of version mismatches. Dependent graphs generated and stored in a pattern database such as pattern database 104, 410 or 801 can include information on dependencies including version information, facilitating risk analysis of this type.

To determine the risk of running an application in a constrained environment, e.g., with a reduced set of libraries, the replicated instances may be tested by simulating various actions or application workloads to see whether or not the running application encounters any errors, glitches, crashes, etc.

Risk analysis may further include testing for or analyzing security risks. Security risks may be analyzed by identifying particular libraries that are utilized in the minimum or reduced size container that are known to be vulnerable. For example, certain libraries or applications may be subject to DoS attacks, have open ports that are subject to exploit, are susceptible to certain attack vectors such as the vmsplice( ) exploit, etc. A pattern database such as pattern database 104, 410 or 801 may be continually updated based on internal analysis and external intelligence to identify such vulnerable libraries.

Step 818 may pass or fail. Step 818 will "pass" if the risk value is below the risk threshold, or if the risk value is at or above the risk threshold but the replication by simulation indicates that the minimization actions are safe. Step 818 will "fail" if the risk value is at or above the risk threshold and the replication by simulation indicates that the minimization actions are not safe. In some embodiments, there may be another (higher) risk threshold, beyond which it is determined that minimization actions are not safe regardless of the outcome of the replication by simulation.

As will be described in further detail below, a risk function may take a value between 0 or 1. The risk threshold may be set to some value between 0 and 1, such as 0.6. If the risk value for a particular container as 0.6 or greater, simulation by replication is performed to determine whether minimization actions are safe. Step 818 fails when the risk value exceeds the threshold and the simulation by replication indicates that the minimization actions are not safe. Otherwise, step 818 passes. It is important to note that the specific range for the risk threshold (0 to 1) and the value of the risk threshold (0.6) are provided by way of example only, and that embodiments are not limited to use with this specific risk value range and risk threshold. Risk values and the risk threshold, for example, may not be numeric but may instead be assigned letter grades (e.g., A-F range), color codes (e.g., green, yellow, orange, red range), etc.

If step 818 fails, the process continues to output in step 826, where the application is deployed without minimization. In other words, the application would be deployed with its original or default container without a reduced set of libraries. If step 818 passes, any new pattern data that is found is stored in the pattern database 801 in step 820.

In step 822, a build configuration is created that includes all the dependent libraries files and any additional requirements, such as configuration settings, etc. Based on the build configuration created in step 822 and the dependencies identified in steps 806 through 816, a minimal or reduced size operating system base image or container for the application is created in step 824. The process 800 then proceeds to the output 826, deploying the application using the base image or container created in step 824.

FIG. 9 shows pseudocode 900 of a graph search algorithm which may be used to find dependency patterns in a pattern database such as pattern database 104, pattern database 410 or pattern database 801. The pseudocode 900 particularly illustrates a breadth-first search algorithm which may be used. In this algorithm, the distance attributes for vertexes or nodes is used to search for the shortest path between the nodes in a graph. To start, the distance for each vertex or node is set to INFINITY, indicating that a node has not been reached yet and thus has no distance from a starting vertex. The parent attribute of each vertex to node can also be useful to access nodes in the shortest path, for example by backtracking from a destination node up to the starting node once the breadth-first search is run and predecessor nodes are set. The parent attribute is initially set to NIL, indicating an absence of a parent or predecessor node.

FIG. 10 shows pseudocode 1000 illustrates a breadth-first search algorithm for association rule learning. Association rule learning may be utilized to determine package names through code analysis and binary scanners. The pseudocode 1000 is an example of an a priori breadth-first search strategy that sweeps through library items and uses a candidate generation function which exploits the downward closure property of support. $C_k$ denotes a candidate itemset of size k, and $L_k$ denotes a frequent itemset of size k. In the join step, $C_k$ is generated by joining $L_{k-1}$ with itself. In the prune step, any (k−1)-itemset that is not frequent cannot be a subset of a frequent k-itemset. As examples, the association rule learning may be used to associate the library libdns.so.100 with the package libbind-dev, to associate the library libssl.so with the package libssl, and to associate the library libbind9 with the package bin9utils.

It is important to note that while the pseudocode 900 and 1000 utilize breadth-first search algorithms, embodiments are not limited solely to use with breadth-first search algorithms. In other embodiments, other types of graph search algorithms may be used including but not limited to depth-first search algorithms.

FIG. 11 depicts pseudocode 1100 for learning dependency patterns. The pseudocode takes as input a labeled set $D_l$, an unlabeled set $D_u$, a number of steps T, and a number of examples per iteration S. A multi-label support vector machine (SVM) classifier is trained based on the training data, $D_l$. For each instance x in the unlabeled set $D_u$, its label is predicted using a loss reduction (LR)-based prediction method with an equation for maximum loss reduction with maximal confidence. The scores for instances x in $D_u$ are sorted and a set of examples are selected with the largest scores. The selection may also be based on subject matter expert (SME) input. The instances x are data points $x_1, \ldots x_n$ and represent a feature vector for dependency patterns, e.g., dependency graph elements. The function $f_i(x)$ is a SVM classifier associated with class i.

Risk analysis, as discussed above, may involve comparing a risk value with a risk threshold. An example risk function is described below. It is to be appreciated, however, that embodiments are not limited solely to use with the specific risk function described below. Other risk or impact functions and analysis may be used in other embodiments. A risk function R is defined as follows:

$$R(\theta,\delta) = \mathbb{E}_\theta L(\theta, \delta(X)) = \int_X L(\theta, \delta(X)) dP_\theta(X)$$

where θ is a fixed, and possibly unknown, state of nature, X is a feature vector of observations stochastically drawn from a population, e.g., prior application and/or server profiles, a list of related upgrade actions, versions, etc., $\mathbb{E}_\theta$ is the expectation over all population values of X, $dP_\theta$ is a probability measure over the event space of X, parametrized by θ, and the integral is evaluated over the entire support of X. The value of the risk function R may vary, for example, from 0 to 1. If the risk value exceeds a threshold, an instance is replicated and actions are simulated for a safety check or risk analysis as described above.

Figure 12:
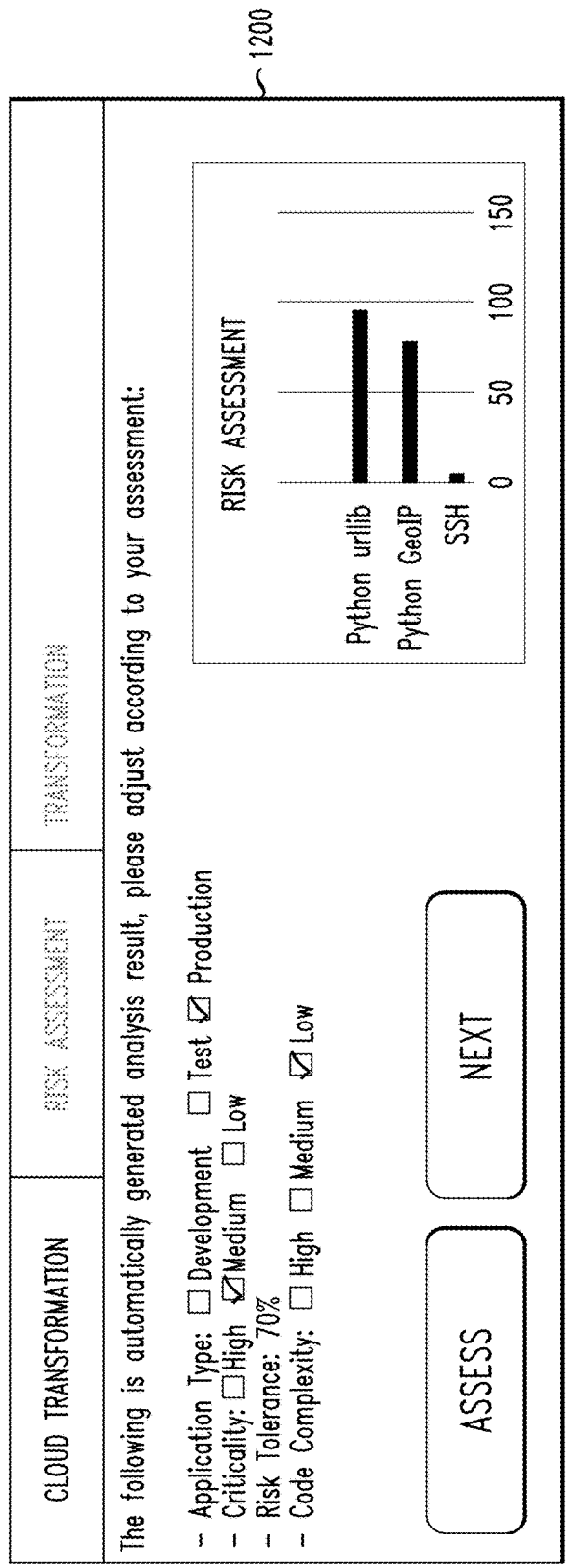
FIG. 12 depicts an example of a risk interface, according to an embodiment of the invention.

FIG. 12 shows an example of a risk interface 1200. As shown, the risk interface 1200 may accept a number of parameters into a risk module such as risk interface module 126 via a graphical user interface (GUI). Such parameters include, by way of example, a criticality value, a domain, a code complexity, a server or application type (development, test or production), etc. Different users can set different tolerance levels for risk. For example, a normal user may set a risk tolerance of 70% whereas a business owner may set a lower risk tolerance such as 20%. The particular risk tolerance percentage may be set by inputting a profile or characteristic (e.g., business or personal). Alternatively or additionally, the risk tolerance percentage may be manually input rather than inferred from a profile or characteristic of the use. Although the risk tolerance is described in the FIG. 12 examples in terms of a percentage, this is not a requirement. In other embodiments, risk tolerance may be color coded (green, orange, red), may be high, medium, low, a scale from 1 to 10, etc. The risk interface 1200, using the input parameters, can evaluate the risk of a particular instance or container, and present various information possibly in a chart as shown.

Figure 13:
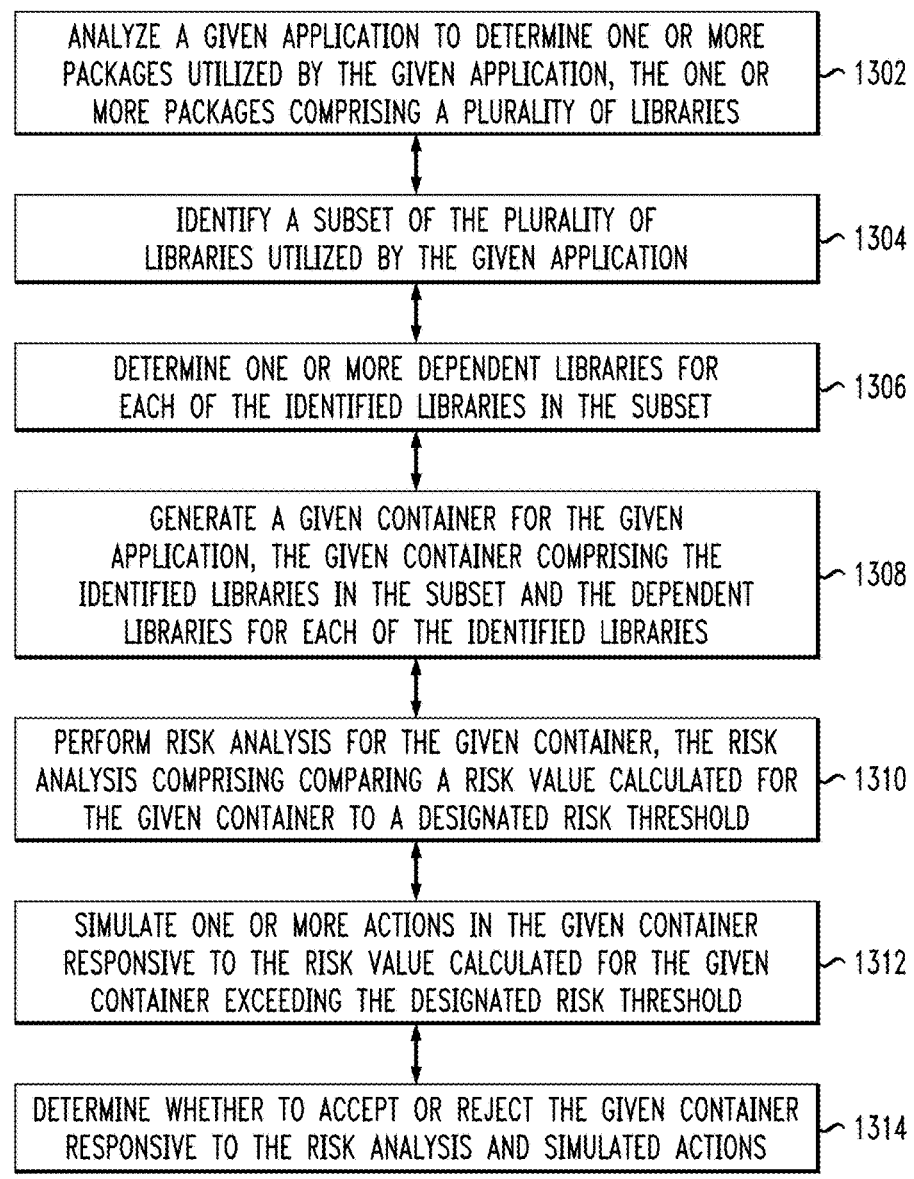
FIG. 13 depicts a process for generating a container for an application, according to an embodiment of the invention.

FIG. 13 shows a process 1300 for generating a container for an application that utilizes a reduced set of libraries. The process 1300 may be performed utilizing the system 100. The process 1300 begins with step 1302, analyzing a given application to determine one or more packages utilized by the given application, the one or more packages comprising a plurality of libraries. In step 1304, a subset of the plurality of libraries that are used by the given application are identified. In some embodiments step 1304 includes analyzing source code of the given application or analyzing a binary of the given application.

The process 1300 continues with step 1306, determining one or more dependent libraries for each of the identified libraries in the subset. Step 1306, in some embodiments, utilizes a pattern database that comprises dependency graphs and/or dependency trees for respective ones of the plurality of libraries. Determining the dependent libraries may include identifying shared and/or static objects that are utilized by the given application, and utilizing the pattern database to determine the dependent libraries for each of the shared objects and static objects. The pattern database may be updated to as to add, modify or delete one or more dependency graphs and dependency trees for one or more of the identified libraries.

In step 1308, a given container for the application is generated, where the given container includes the identified libraries in the subset as well as the dependent libraries for each of the identified libraries in the subset. The given container may comprise an operating system base image, a virtual machine, a micro-container, a portable container, etc. The given container generated in step 1308 may have, relative to another container for the given application that includes all of the plurality of libraries rather than the identified subset of the plurality of libraries, one or more of the following properties: a smaller memory footprint; a faster boot time; and utilizes less processing power.

Risk analysis for the given container is performed in step 1310. In some embodiments, the risk analysis comprises comparing a risk value calculated for the given container to a designated risk threshold. In response to the risk value calculated for the given container exceeding the designated risk threshold, one or more actions are simulated in the given container in step 1312. A determination is made whether to accept or reject the given container in step 1314 responsive to the risk analysis and simulated actions.

In some embodiments, the risk analysis in step 1310 includes obtaining one or more security parameters and setting the designated risk threshold based on the security parameters. The security parameters may include, by way of example, an application type associated with the given application, a criticality associated with the given application, a risk tolerance and a code complexity associated with the given application. The risk analysis performed in step 1310 may also or alternatively include assessing a business impact associated with the given application. The business impact may be assessed, in some cases, by considering one or more of the obtained security parameters or other information relating to the given application as described elsewhere herein.

Simulating the one or more actions in step 1312 may include determining potential risks associated with running the given application utilizing the given container without one or more of the plurality of libraries not included in the identified subset of libraries. Accepting the given container in step 1314 may include deploying the given container, such as deploying the given container as a SaaS in a cloud computing environment such as cloud computing environment 106. Rejecting the given container in step 1314 may include deploying a default or original container, where the default or original container includes the libraries that are not in the subset, e.g., the libraries removed so as to generate the given container. The given container in some embodiments does not comprise or include respective ones of the plurality of libraries that are not in the subset. Relative to the default container, the given container may have a smaller memory footprint, a faster boot time, and/or may utilize less processing power.

The risk analysis in step 1310 may be utilized by a risk assessment interface to provide one or more visualizations of a risk associated with running the given application using the given container.

Various embodiments described herein provide a number of advantages. For example, some embodiments permit automated generation of build configurations for application containers, as well as providing a plugins to development and operations cycles for new applications. Some embodiments facilitate finding dependent components of an application to compose minimal or reduced size operating system images or containers for applications, management tools, etc.

Code level minimization may be used to reduce an application object size while developing an application. Embodiments can provide further improvements in reducing the size of where the application runs, such as in creating minimal or reduced size operating system images. Some embodiments also facilitate the migration of existing applications, which are already developed, to newer operating environments with minimal or reduced size footprints.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 14:
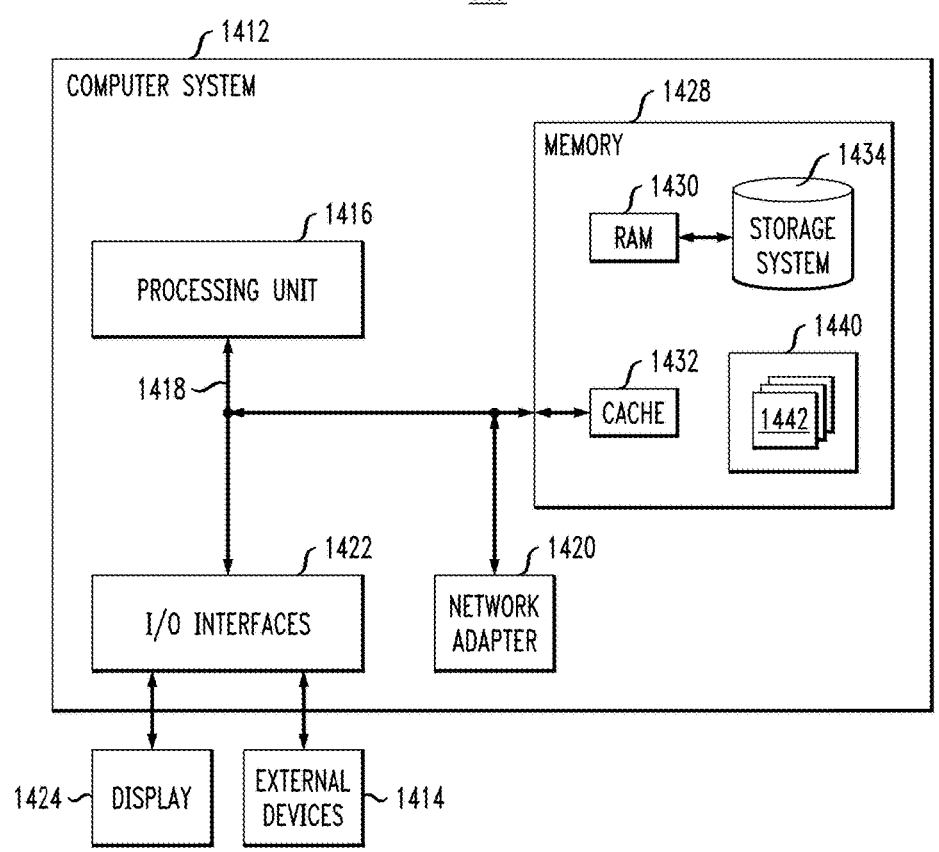
FIG. 14 depicts a computer system in accordance with which one or more components/steps of techniques of the invention may be implemented, according to an embodiment of the invention.

One or more embodiments can make use of software running on a general-purpose computer or workstation. With reference to FIG. 14, in a computing node 1410 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 1412 in computing node 1410 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

The bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1412 typically includes a variety of computer system readable media. Such media may be any available media that is accessible by computer system/server 1412, and it includes both volatile and non-volatile media, removable and non-removable media.

The system memory 1428 can include computer system readable media in the form of volatile memory, such as random access memory (RAM) 1430 and/or cache memory 1432. The computer system/server 1412 may further include other removable/non-removable, volatile/nonvolatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1418 by one or more data media interfaces. As depicted and described herein, the memory 1428 may include at least one program product having a set (e.g., at least one) of program modules that are configured to carry out the functions of embodiments of the invention. A program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc., one or more devices that enable a user to interact with computer system/server 1412, and/or any devices (e.g., network card, modem, etc.) that enable computer system/server 1412 to communicate with one or more other computing devices. Such communication can occur via I/O interfaces 1422. Still yet, computer system/server 1412 can communicate with one or more networks such as a LAN, a general WAN, and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 15:
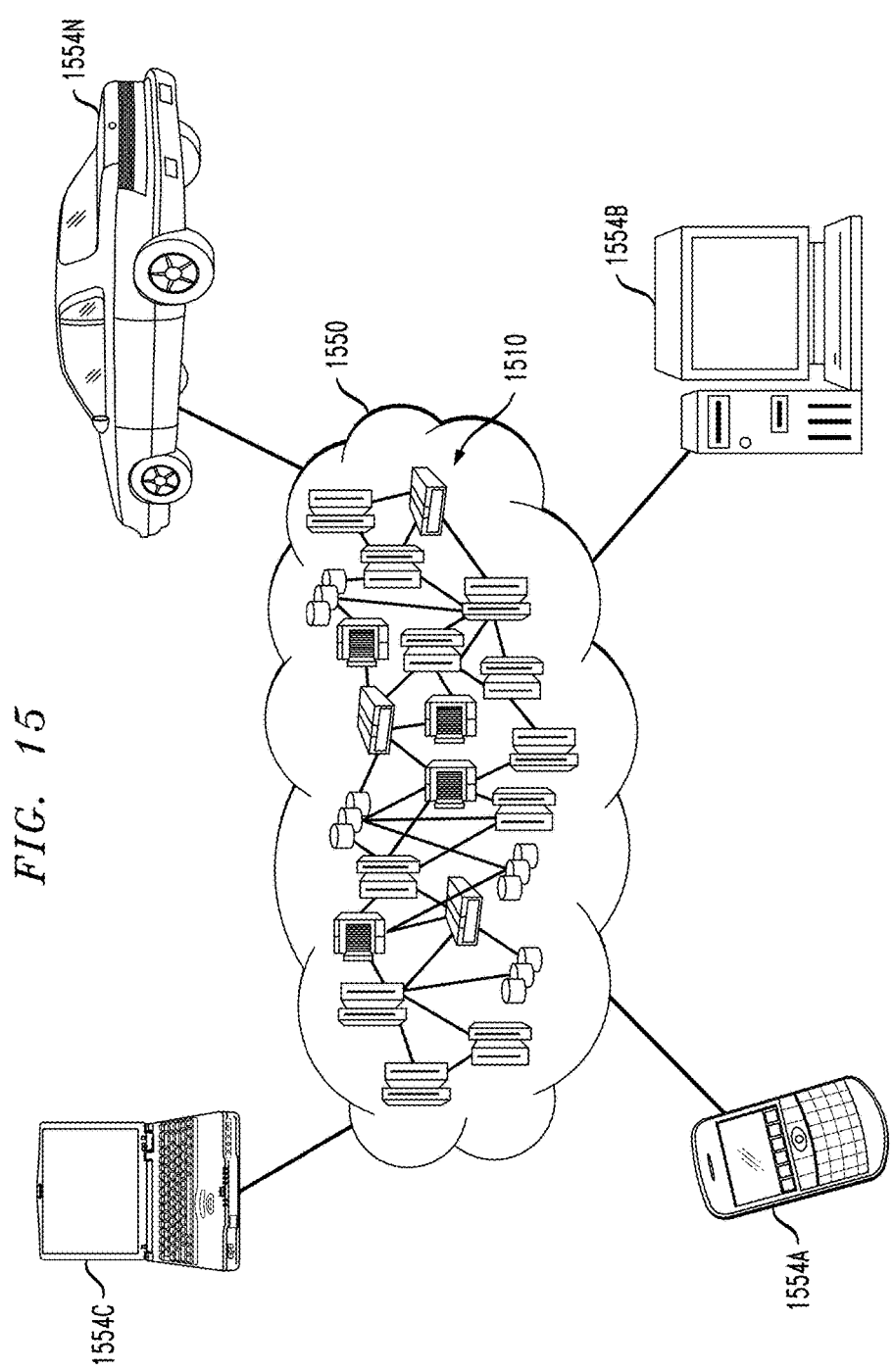
FIG. 15 depicts a cloud computing environment, according to an embodiment of the present invention.

Referring now to FIG. 15, illustrative cloud computing environment 1550 is depicted. As shown, cloud computing environment 1550 includes one or more cloud computing nodes 1510 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1510 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 15 are intended to be illustrative only and that computing nodes 1510 and cloud computing environment 1550 can communicate with any type of computerized device over any type of network and/or network addressable connection (e.g., using a web browser).

Figure 16:
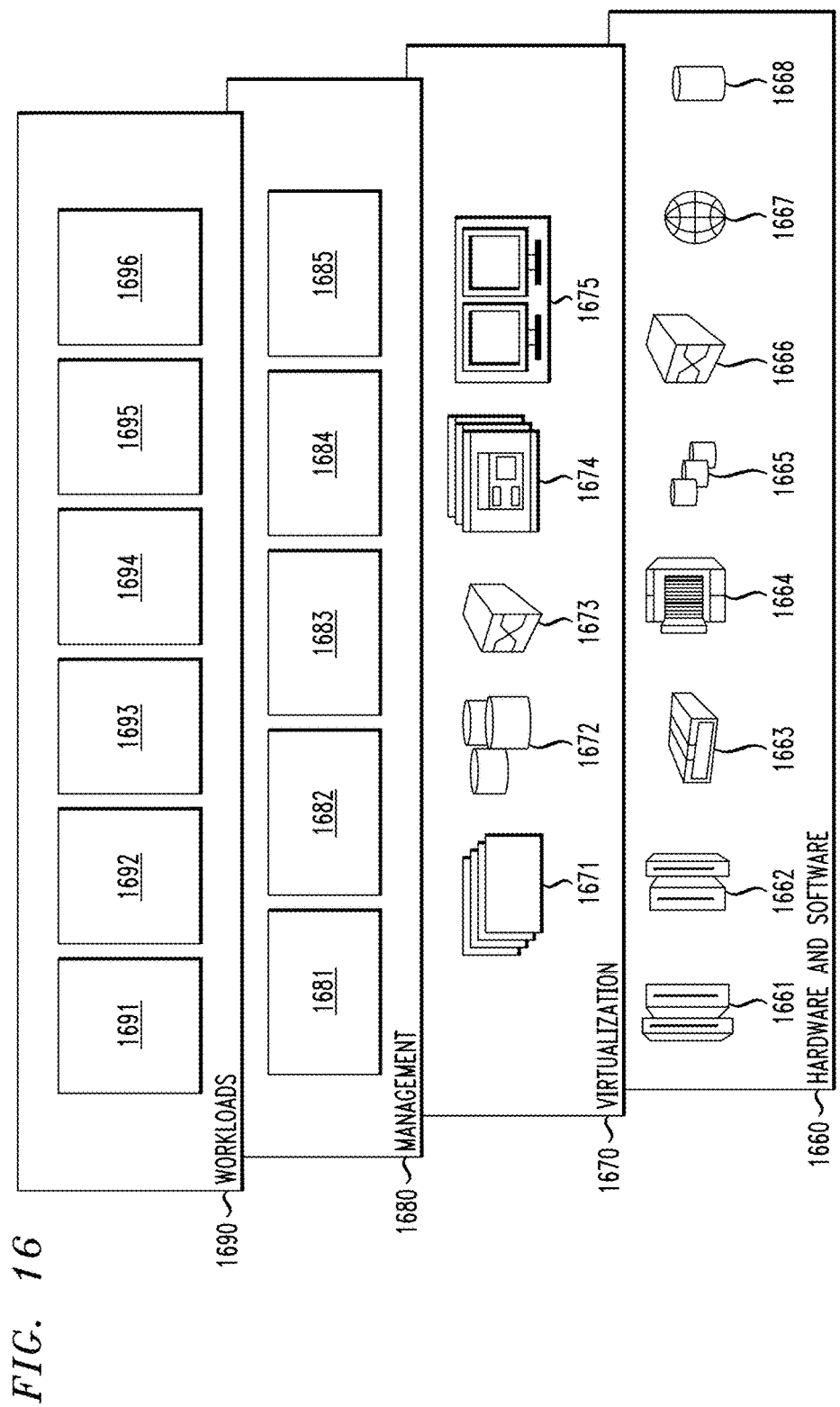
FIG. 16 depicts abstraction model layers, according to an embodiment of the present invention.

Referring now to FIG. 1, a set of functional abstraction layers provided by cloud computing environment 1550 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 1660 includes hardware and software components. Examples of hardware components include: mainframes 1661; RISC (Reduced Instruction Set Computer) architecture based servers 1662; servers 1663; blade servers 1664; storage devices 1665; and networks and networking components 1666. In some embodiments, software components include network application server software 1667 and database software 1668.

Virtualization layer 1670 provides an abstraction layer from which the following examples of virtual entities may be provided: virtual servers 1671; virtual storage 1672; virtual networks 1673, including virtual private networks; virtual applications and operating systems 1674; and virtual clients 1675.

In one example, management layer 1680 may provide the functions described below. Resource provisioning 1681 provides dynamic procurement of computing resources and other resources that are utilized to perform tasks within the cloud computing environment. Metering and Pricing 1682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1683 provides access to the cloud computing environment for consumers and system administrators. Service level management 1684 provides cloud computing resource allocation and management such that required service levels are met. Service Level Agreement (SLA) planning and fulfillment 1685 provide pre-arrangement for, and procurement of, cloud computing resources for which a future requirement is anticipated in accordance with an SLA.

Workloads layer 1690 provides examples of functionality for which the cloud computing environment may be utilized.

Examples of workloads and functions which may be provided from this layer include: mapping and navigation 1691; software development and lifecycle management 1692; virtual classroom education delivery 1693; data analytics processing 1694; transaction processing 1695; and application transformation 1696, which may perform various functions described above with respect to the application transformation system 104.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    analyzing a given application to determine one or more packages utilized by the given application, the one or more packages comprising a plurality of libraries;
    identifying a subset of the plurality of libraries utilized by the given application;
    determining one or more dependent libraries for each of the identified libraries in the subset;
    generating a given container for the given application, the given container comprising the identified libraries in the subset and the dependent libraries for each of the identified libraries;
    performing risk analysis for the given container, the risk analysis comprising comparing a risk value calculated for the given container to a designated risk threshold;
    simulating one or more actions in the given container responsive to the risk value calculated for the given container exceeding the designated risk threshold; and
    determining whether to accept or reject the given container responsive to the risk analysis and simulated actions;
    wherein the method is performed by at least one processing device comprising a processor coupled to a memory; and
    wherein the given container comprises a reduced set of libraries relative to a default container for the given application that comprises all of the plurality of libraries in the one or more packages utilized by the given application, such that the given container at least one of: has a smaller memory footprint relative to the default container; has a faster boot time relative to the default container; and utilizes less processing power relative to the default container; and
    wherein the given container provides enhanced security relative to the default container by at least one of: including less code subject to exploitation; and reducing a number of open network ports.

2. The method of claim 1, wherein the given container comprises an operating system base image.

3. The method of claim 1, wherein the given container comprises a virtual machine.

4. The method of claim 1, wherein the given container comprises a portable container.

5. The method of claim 1, wherein identifying the subset of the plurality of libraries utilized by the given application comprises analyzing source code of the given application.

6. The method of claim 1, wherein identifying a subset of the plurality of libraries utilized by the given application comprises analyzing a binary of the given application.

7. The method of claim 1, wherein determining the one or more dependent libraries comprises utilizing a pattern database, the pattern database comprising at least one of: one or more dependency graphs for respective ones of a plurality of libraries; and one or more dependency trees for respective ones of the plurality of libraries.

8. The method of claim 7, wherein determining the one or more dependent libraries further comprises:
    identifying one or more shared objects and one or more static objects utilized by the given application; and
    utilizing the pattern database to determine dependent libraries for each of the shared objects and static objects.

9. The method of claim 7, further comprising at least one of adding and modifying one or more dependency graphs and one or more dependency trees in the pattern database for at least one of the identified libraries.

10. The method of claim 1, further comprising:
    obtaining one or more security parameters; and
    setting the designated risk threshold based on the security parameters.

11. The method of claim 10, wherein the security parameters comprise one of more of:
    an application type associated with the given application;
    a criticality associated with the given application;
    a risk tolerance; and
    a code complexity associated with the given application.

12. The method of claim 1, wherein simulating the one or more actions comprises determining potential risks associated with running the given application utilizing the given container without one or more of the plurality of libraries not included in the identified subset of libraries.

13. The method of claim 1, further comprising providing one or more visualizations of a risk associated with running the given application using the given container via a risk assessment interface.

14. The method of claim 1, wherein performing the risk analysis comprises assessing a business impact associated with the given application.

15. The method of claim 1, wherein:
    accepting the given container comprises deploying the given container; and
    rejecting the given container comprises deploying the default container for the given application that includes the libraries not in the subset.

16. The method of claim 15, wherein deploying the given container comprises deploying the given container as a software-as-a-service in one or more cloud computing environments.

17. The method of claim 1, wherein the given container does not comprise respective ones of the plurality of libraries not in the subset.

18. A computer program product comprising a computer readable storage medium for storing computer readable program code which, when executed, causes a computer:
    to analyze a given application to determine one or more packages utilized by the given application, the one or more packages comprising a plurality of libraries;
    to identify a subset of the plurality of libraries utilized by the given application;
    to determine one or more dependent libraries for each of the identified libraries in the subset;

to generate a given container for the given application, the given container comprising the identified libraries in the subset and the dependent libraries for each of the identified libraries;

to perform risk analysis for the given container, the risk analysis comprising comparing a risk value calculated for the given container to a designated risk threshold;

to simulate one or more actions in the given container responsive to the risk value calculated for the given container exceeding the designated risk threshold; and to determine whether to accept or reject the given container responsive to the risk analysis and simulated actions;

wherein the given container comprises a reduced set of libraries relative to a default container for the given application that comprises all of the plurality of libraries in the one or more packages utilized by the given application, such that the given container at least one of: has a smaller memory footprint relative to the default container; has a faster boot time relative to the default container; and utilizes less processing power relative to the default container; and wherein the given container provides enhanced security relative to the default container by at least one of: including less code subject to exploitation; and reducing a number of open network ports.

19. The computer program product of claim 18, wherein simulating the one or more actions comprises determining potential risks associated with running the given application utilizing the given container without one or more of the plurality of libraries not included in the identified subset of libraries.

20. An apparatus comprising:
a memory; and
a processor coupled to the memory and configured:
to analyze a given application to determine one or more packages utilized by the given application, the one or more packages comprising a plurality of libraries;

to identify a subset of the plurality of libraries utilized by the given application;

to determine one or more dependent libraries for each of the identified libraries in the subset;

to generate a given container for the given application, the given container comprising the identified libraries in the subset and the dependent libraries for each of the identified libraries;

to perform risk analysis for the given container, the risk analysis comprising comparing a risk value calculated for the given container to a designated risk threshold;

to simulate one or more actions in the given container responsive to the risk value calculated for the given container exceeding the designated risk threshold; and to determine whether to accept or reject the given container responsive to the risk analysis and simulated actions;

wherein the given container comprises a reduced set of libraries relative to a default container for the given application that comprises all of the plurality of libraries in the one or more packages utilized by the given application, such that the given container at least one of: has a smaller memory footprint relative to the default container; has a faster boot time relative to the default container; and utilizes less processing power relative to the default container; and wherein the given container provides enhanced security relative to the default container by at least one of: including less code subject to exploitation; and reducing a number of open network ports.

* * * * *